US012731191B2

(12) United States Patent
Cortes Martinez et al.

(10) Patent No.: US 12,731,191 B2
(45) Date of Patent: Sep. 8, 2026

(54) SYSTEMS AND METHODS FOR HIGH-RISK EVENT DETECTION

(71) Applicant: Allstate Insurance Company, Northbrook, IL (US)

(72) Inventors: Herbert Leandro Cortes Martinez, Chicago, IL (US); Matei Stroila, Chicago, IL (US); Mohan Kola, Rolling Meadows, IL (US); Alwar Narayanan, Bloomington, IL (US); Timothy W. Gibson, Barrington, IL (US)

(73) Assignee: Allstate Insurance Company

( * ) Notice: Subject to any disclaimer, the term of this patent is extended or adjusted under 35 U.S.C. 154(b) by 138 days.

(21) Appl. No.: 18/538,521

(22) Filed: Dec. 13, 2023

(65) Prior Publication Data

US 2025/0200666 A1 Jun. 19, 2025

(51) Int. Cl.
*G06Q 40/08* (2012.01)
*G01C 21/36* (2006.01)

(52) U.S. Cl.
CPC ......... *G06Q 40/08* (2013.01); *G01C 21/3697* (2013.01)

(58) Field of Classification Search
CPC ...................................................... G06Q 40/08
See application file for complete search history.

(56) References Cited

U.S. PATENT DOCUMENTS 8,799,032 B2 * 8/2014 Fernandes ................ G07C 5/00 705/4
2021/0174677 A1 * 6/2021 Oh ......................... G08G 1/052
2022/0270177 A1 * 8/2022 Chintakindi .......... H04W 4/029

* cited by examiner

*Primary Examiner* — Edward Chang

(57) ABSTRACT

In one aspect, a method includes receiving a telematics data associated with a vehicle collected from one or more data sources and determining, using a machine-learning model trained to identify high-risk driving behaviors using telematics data, one or more predictions based on the telematics data. A prediction of the one or more predictions is associated with a current time. The method may further include generating a time-based report of the one or more predictions. The time-based report identifies instances of the one or more predictions that reach a threshold value.

14 Claims, 6 Drawing Sheets

FIG. 6

SYSTEMS AND METHODS FOR HIGH-RISK EVENT DETECTION

TECHNICAL FIELD

Aspects of the presently disclosed technology related generally to high-risk event detection and more particularly to predicting the occurrence of a high-risk event based on a high-risk event prediction machine learning algorithm.

BACKGROUND

Various events can occur in connection with operation of a vehicle, which may range in severity depending on a nature of the event. Understanding and predicting certain types of events may be beneficial in various contexts. However, identification of different events, let alone predicting particular events, is challenging. In many instances, physical evidence is not associated with an occurrence of an event, making identification of different types of events challenging. Exacerbating these challenges, operation of vehicles may vary depending on vehicle type, for example, such that the vehicles behave differently in connection with certain events. It is with these observations in mind, among others, that aspects of the presently disclosed technology were conceived.

BRIEF SUMMARY

In one aspect, a method includes receiving telematics data associated with a vehicle collected from one or more data sources and determining, using a machine-learning model trained to identify high-risk driving behaviors using telematics data, one or more predictions based on the telematics data. A prediction of the one or more predictions is associated with a current time. The method may further include generating a time-based report of the one or more predictions. The time-based report identifies instances of the one or more predictions that reach a threshold value.

In another aspect, the telematics data includes at least one of a predefined acceleration vector over a predefined amount of time or time series, or a velocity vector over a predefined amount of time or time series. In another aspect, the telematics data includes a geographical location associated with the vehicle, and where the prediction of the one or more predictions is also associated with a current geographical location of the vehicle associated with the current time. In another aspect, the threshold value indicates the occurrence of a high-risk driving event or an accident. In another aspect, the method may further include transmitting the time-based report to a remote device.

In another aspect, the method may further include determining, using a machine-learning model trained to identify high risk driving behaviors using telematics data, one or more predictions based on the telematics data. A prediction of the one or more predictions is associated with a current time and is further based on a telematics data associated with a second vehicle. In another aspect, the method may further include training the machine-learning model using historical occurrences of high-risk driving events and accidents. In another aspect, the one or more data sources includes at least one of a mobile device, one or more sensors associated with the vehicle, a dashboard camera associated with the vehicle, or global positioning systems. In another aspect, the one or more predictions are determined in real-time. In another aspect, the time-based report includes a simulated map displaying where the instances of the one or more predictions that reach the threshold value occurred. In another aspect, the method may further include transmitting the time-based report to the remote device includes sending, at least one of an accident alert to a mobile device, a pricing variable to an insurance pricing model, or a tow request to a device associated with a tow service.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed descriptions are to be regarded as illustrative in nature and not limiting.

BRIEF DESCRIPTION OF THE DRAWINGS

FIG. 6 illustrates an example flowchart for predicting high-risk events according to aspects of the present disclosure.

DETAILED DESCRIPTION

Figure 1:
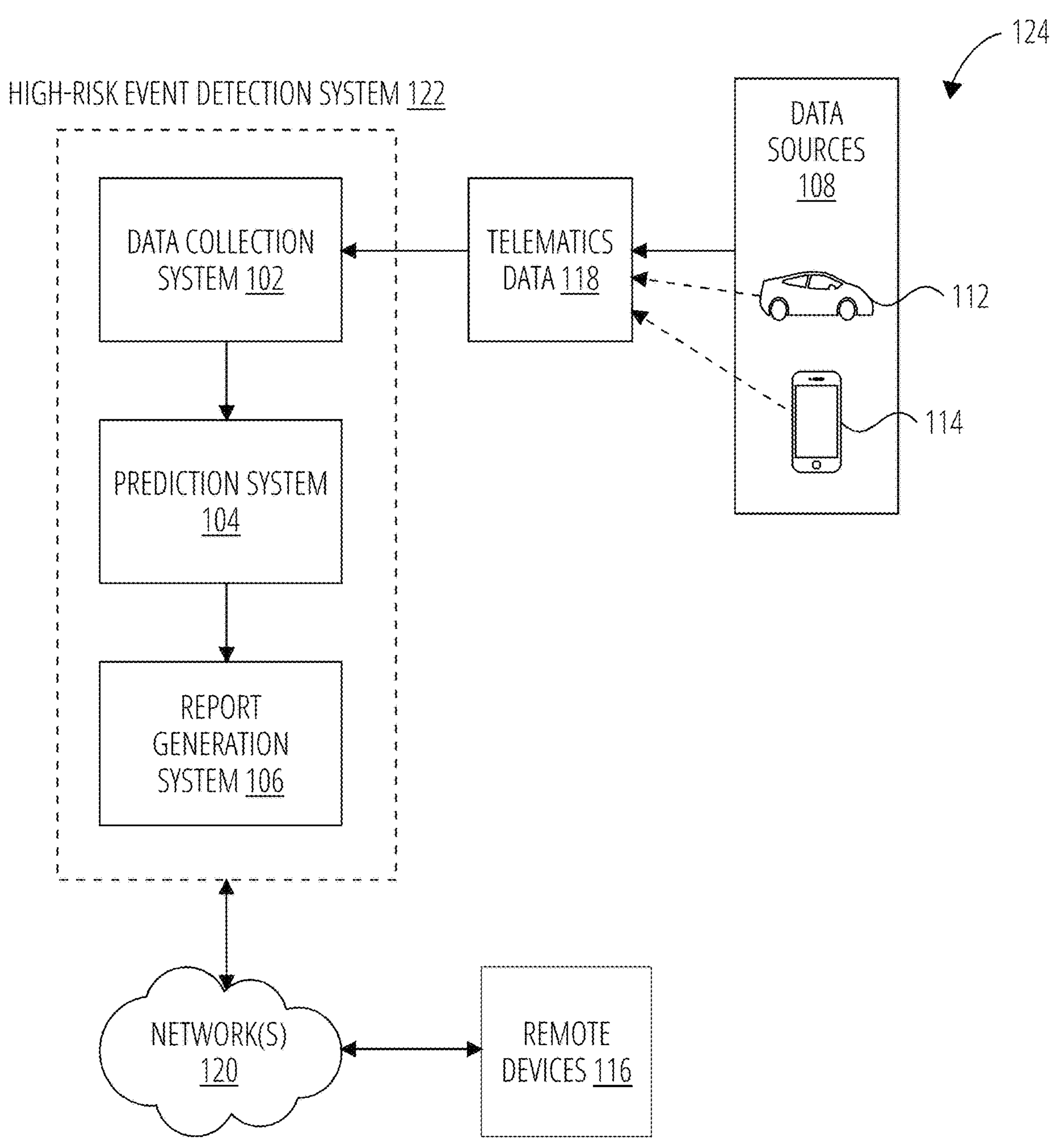
FIG. 1 illustrates an example system for predicting high-risk events according to aspects of the present disclosure.

Detecting high-risk events can provide numerous benefits to a driver of a vehicle, drivers of other vehicles, law enforcement, emergency response, navigation services, and any other third party that may be affected by traffic flow or the actions of drivers on a shared roadway. For example, a driver may be warned after a certain number of high-risk events occur on a given trip that their driving may be endangering others. In some other examples, a large number of high-risk events in a given geographic area may indicate unsafe driving conditions, such as wet roads, icy roads, traffic, bumpy road conditions, or other issues, which may encourage global positioning system (GPS) mobile phone applications or other routing systems to route additional vehicles around the given geographic area. A high-risk event may also be used to generate and/or update a driving behavior profile of a driver.

In some aspects, detection of high-risk events involves determining whether motion detected by one or more telematics devices indicates high-risk vehicle behavior. Detection of these high-risk events can be difficult, however, due to a lack of physical evidence that does not always accompany a high-risk event (as opposed to a collision, a vehicle accident, a vehicle failure, etc.). As such, a high-risk event can be somewhat subjective, depending on the vehicle, the environment, the driver, etc., and is therefore more difficult to predict. Accordingly, the presently disclosed technology identifies one or more indicators of high-risk events (e.g., hard-braking events, rapid changes in speed or acceleration, etc.), utilizing machine-learning systems.

For example, using telematics data gathered from one or more sources, a high-risk event detection system may implement one or more machine-learning models to determine a prediction for the likelihood of the occurrence of a high-risk event. The high-risk event detection system may receive lateral acceleration data, longitudinal acceleration data, velocity data, GPS data, accelerometer data, gyroscope data, any combination thereof, or the like, and may input the telematics data into a machine-learning model trained to predict the occurrence of a high-risk event. The machine-learning model may output a prediction (e.g., a number between 0 and 1) that may be compared to a threshold value. The threshold value may indicate the existence of a high-risk event.

Over the course of a trip associated with a driver and a vehicle, the high-risk event detection system may generate one or more data points associated with detected high-risk events and may place the one or more data points on a simulated map. The simulated map may demonstrate the trip (e.g., a particular route the driver took on the vehicle) and may show where the detected high-risk events occurred within the context of the trip. For example, the simulated map may indicate that a high-risk event occurred at the corner of First Lane and Main Street. The simulated map may be presented using a graphical user interface (GUI). The GUI may be associated with a mobile device associated with the driver, a computing device associated with an administrator of a network that facilitates the high-risk event detection system, any combination thereof, or the like.

In addition to the simulated map, the high-risk event detection system may also generate one or more graphs representing one or more variables associated with the telematics data over time. The one or more graphs may also include a visual representation of where detected high-risk events occurred over the duration of the trip. For example, the graph representing the speed of the vehicle over time may indicate a steep decline in speed twelve minutes into the trip. The steep decline may indicate a high-risk event (e.g., harsh braking and/or a collision) that caused a dramatic decrease in speed. The one or more graphs may also be presented using a GUI on a mobile device and/or a computing device.

FIG. 1 illustrates an example system for predicting events with a designated risk level (e.g., high-risk, low-risk, medium risk, etc.) according to aspects of the present disclosure. It will be appreciated that although the example implementations are discussed with respect to high-risk events, that the presently disclosed technology may be applied to events having other designated risk levels. High-risk event detection system 122 may predict the occurrence of a high-risk event (e.g., a hard braking event, a rapid change in acceleration, a collision, a vehicle accident, aggressive behavior, following closely, close proximity to objects, high speed turning, etc.) using telematics data 118 received from one or more data sources. The high-risk event detection system 122 may be associated with a communication network (e.g., network(s) 120), which may be a local area network (LAN), wireless LAN (WLAN), personal area network (PAN), wide area network (WAN), any combination thereof, or the like. High-risk event detection system 122 may transmit predictions of high-risk events to network(s) 120 to generate graphic depictions (e.g., a simulated map, a graph, etc.) of a vehicle's and/or a driver's travel path.

Telematics data 118 used by high-risk event detection system 122 may be received from data sources 108. Data sources 108 may include one or more external sources, including, but not limited to, vehicle 112, mobile device 114, traffic cameras, RADAR data, global positioning systems (GPS), any combination thereof, or the like. The telematics data 118 may include raw data gathered from data sources 108 that pertain to a particular trip of a vehicle and/or driver. The particular trip may be defined by the vehicle turning on, traveling a threshold distance, then subsequently turning off. In some examples, the trip may be defined by a starting destination and a final destination (e.g., traveling to work from your home would constitute a trip, despite stopping halfway for gas). In some examples, a machine-learning model may be trained to identify common trips for a driver and/or vehicle (e.g., a route to school, work, a friend's house, favorite restaurant, etc.), and may automatically define the particular trip according to the common trip according to a day, time, beginning of particular trip (e.g., heading north on Main St.), etc. In some examples, the particular trip may be input manually by the driver on a user interface of a user device associated with high-risk event detection system 122 and/or telematics data 118. For example, the driver may input a final destination into a GPS application on a mobile device, and high-risk event detection system 122 and/or telematics data 118 may query the GPS application for the final destination. In another example, the driver may input the details regarding the particular trip into a mobile phone application associated with high-risk event detection system 122.

Through the duration of the particular trip, data sources 108 may be transmitting raw data to telematics data 118. Telematics data 118 may be implemented on a mobile device associated with the driver and/or the vehicle, a remote server, a computing device associated with the vehicle, a central controller, a server associated with one or more managing entities (e.g., an insurance company), any combination thereof, or the like. Data sources 108 may transmit the raw data to telematics data in real-time or near-real time. In some examples, data sources 108 may transmit the raw data after the conclusion of the particular trip. In some other implementations, telematics data 118 may query data sources 108 for raw data. The raw data may include, but is not limited to, gyroscope data of the vehicle, dashboard camera video footage of the vehicle, RADAR data of the vehicle, speed/velocity data of the vehicle, acceleration (e.g., two-dimensional acceleration, with lateral and/or longitudinal acceleration, and/or three-dimensional acceleration) data of the vehicle, any combination thereof, or the like. In some examples, vehicle 112 may transmit the raw data to telematics data 118, and may gather the raw data from a dashboard camera mounted on the vehicle 112, one or more sensors placed on vehicle 112, GPS data associated with vehicle 112, RADAR sensors placed on vehicle 112, any combination thereof, or the like. Mobile device 114 may also transmit data to telematics data 118. Mobile device 114 may gather data using internal sensors included in mobile device 114 (e.g., microphone, camera, gyroscope, accelerometer, thermometer, etc.) and may transmit to telematics data 118 in real-time or near-real-time.

Telematics data 118 may receive the raw data from data sources 108 and may manipulate the data for high-risk event detection system 122. For example, telematics data 118 may consolidate the raw data received from data sources 108. In some other examples, telematics data 118 may compare raw data received and discard outlier data (e.g., compare GPS data received from vehicle 112 and GPS data received from mobile device 114 and discard the incorrect data, if applicable). Telematics data 118 may also manipulate through one or more mathematical algorithms, which may include, but are not limited to, identifying magnitude of vectors include in the raw data (e.g., velocity, acceleration, etc.), separating vectors into lateral and longitudinal elements, performing smoothing operations on data, any combination thereof, or the like.

Telematics data 118 may transmit the raw data to high-risk event detection system 122 in real-time and/or near-real-time to generate immediate feedback for the driver and/or the vehicle. High-risk event detection system 122 may be implemented on a mobile device associated with the driver and/or the vehicle, a remote server, a computing device associated with the vehicle, a central controller, a server associated with one or more managing entities (e.g., an insurance company), at the same location as telematics data 118, any combination thereof, or the like. In some examples, telematics data 118 may not transmit the raw data automatically, and may transmit it after a duration of time, after a certain amount of raw data has been received, as historical data is processed by high-risk event detection system 122, any combination thereof, or the like. In some other examples, high-risk event detection system 122 may query telematics data 118 for the raw data, such that high-risk event detection system 122 performs post-processing of the raw data from telematics data 118 (e.g., analysis of the particular trip and potential high-risk events after the particular trip has concluded and/or not in real-time).

Data collection system 102 may receive the raw data from telematics data 118. Data collection system 102 may aggregate or combine the raw data according to requirements of high-risk event detection system 122. In some examples, data collection system 102 may store the raw data in a database accessible by high-risk event detection system 122. The raw data may be stored in a local database associated with network(s) 120, a cloud-based database, or any other storage device capable of storing the raw data. Data collection system 102 may time-stamp the raw data prior to storing the raw data in the database.

Data collection system 102 may transmit the raw data to prediction system 104. Prediction system 104 may include one or more machine-learning models (e.g., recurrent neural networks, large language models, deep neural networks, generative adversarial networks, decision trees, support vector machines, k-means, convolutional neural networks, etc.) trained to generate a prediction for the likelihood of the occurrence of a high-risk event over the duration of the particular trip of the driver and/or user. The one or more machine-learning models may be configured to process the raw data according to a high-risk event prediction algorithm. The high-risk event prediction algorithm may be trained by a series of historical data sets associated with historical trips. The historical trips may include one or more events, which may include high-risk events. The high-risk event prediction algorithm may be trained, using the series of historical data sets, to identify high-risk events, near-misses, and vehicle accidents.

Prediction system 104 may receive the raw data (e.g., acceleration data—including acceleration vector data, longitudinal acceleration, and/or lateral acceleration—and/or velocity data) from data collection system 102 for processing by the one or more machine-learning models. Prediction system 104 may generate a prediction of the occurrence of a high-risk event using all or a portion of the raw data. For example, a first portion of the raw data (e.g., a predefined acceleration vector over a predefined amount of time or time series and/or a velocity vector over a predefined amount of time or time series) may be used by prediction system 104 to generate the prediction, while a second portion of the raw data may be discarded. In this example, the selection of the raw data used by prediction system 104 may be based on processing power, tolerance requirements, data accuracy, data reliability, processing constraints, bandwidth constraints, time requirements, any combination thereof, or the like. In some examples, the discarded raw data may be stored in a storage location accessible to the prediction system 104. In some other examples, the entirety of the raw data may be used by prediction system 104 to generate the prediction.

In some other examples, prediction system 104 may perform additional processing on the raw data to enable processing by prediction system 104. For example, prediction system 104 may dissect vector data into discrete parts to perform direction-based calculations (e.g., translating an acceleration vector into a longitudinal and lateral acceleration value).

The raw data may be directed to a processor included in prediction system 104 with a request to generate a prediction based on the raw data. The processor may monitor the one or more machine-learning models, train new machine-learning models, retrain (or reinforce) existing machine-learning models, delete machine-learning models, and/or the like. Since the processor manages the operations of a variety of machine-learning models, each request to the processor may include an identification of a particular machine-learning mode, a requested output, or the like, to enable the processor to execute an appropriate machine-learning model or instantiate and train a new machine-learning mode. Alternatively, the processor may analyze the raw data to select an appropriate machine-learning model configured to process data of that type.

Using the raw data and a machine-learning model of the one or more machine-learning models, prediction system 104 may output a likelihood that the raw data indicates the occurrence of a high-risk event. In some examples, this may be portrayed through a single number output (e.g., a number between 0 and 1, where 0 indicates a low likelihood and a 1 indicates a very high likelihood) to be output to report generation system 106. The output may be compared to a predetermined threshold value indicating that a high-risk event took place. For example, if the output is over 0.85, then prediction system 104 can conclude that a high-risk event took place. This determination may be conducted by prediction system 104 or another component of high-risk event detection system 122 (e.g., report generation system 106). In some examples, the raw data may indicate the occurrence of more than one high-risk event. Prediction system 104 may generate more than one prediction with the raw data, where the more than one predictions are differentiated using time stamps associated with relevant data, GPS data from a given time stamp, etc. included in the raw data.

The output generated by prediction system 104 may be received by report generation system 106. Report generation system 106 may receive, in addition to the output from prediction system 104, additional data from one or more other components associated with high-risk event detection system 122 (e.g., data collection system 102, telematics data 118, etc.) necessary to generate reports intended for the driver, a vehicle owner, an insurance provider, a law enforcement officer, an emergency responder, any combination thereof, or the like. The reports may be specific to a particular trip, a driver, a street, a vehicle, a time period, any combination thereof, or the like. For example, a report may be generated for a vehicle owner (e.g., a parent with two children learning to drive on the same vehicle) that includes all high-risk events associated with the vehicle over a given day. In some examples, report generation system 106 may generate a simulated map in real-time or near-real-time that displays the particular trip (or more than one trip) of the driver and/or vehicle. The simulated map may include an overlay indicating a travel route of the driver and/or vehicle. The simulated map may also include an overlay indicating where, on the travel route, one or more high-risk events were likely to have occurred. For example, if the driver hard-braked at a stoplight on Main St., the simulated map may display a visual representation of where the hard-braking event occurred on the map (e.g., with a red dot, a flag, an exclamation point, an arrow, etc.). In some examples, report generation system 106 may receive more than one prediction from prediction system 104 to compile into a single report. For example, four high-risk events may be predicted over the duration of the particular trip associated with the driver, and report generation system 106 may generate a report intended for the driver associated with the particular trip that includes the four high-risk events.

Report generation system 106 may also generate one or more graphs (e.g., histograms, line graphs, point charts, pie charts, etc.) pertaining to the particular trip of the driver and/or vehicle. For example, the graphs may include data from telematics data 118 (e.g., acceleration, speed, etc.) over time. In some examples, the graphs may include pie charts indicating a percentage of accelerations that are identified as high-risk events. Similar to the simulated map, the one or more graphs may include an overlay indicating where, over time, a high-risk event may have occurred. For example, a line graph charting acceleration over time may mark one or more instances of an identified high-risk event at the 2.5 minute mark, 7 minute mark, and 9.5 minute mark of the particular trip.

Report generation system 106 may also generate one or more alerts intended for one or more recipients. The recipients may include, but are not limited to, first responders (e.g., ambulances, tow trucks, police, fire fighters, etc.), emergency contacts of the driver (e.g., parents/guardians, spouses, etc.), devices associated with an insurance provider, other user devices, any combination thereof, or the like. For example, the one or more alerts may indicate to an emergency contact and a first responder that a high-risk event, likely resulting in a collision, has occurred at a specific location. In some other examples, the one or more alerts may notify other nearby drivers about potentially unsafe road conditions, traffic conditions, accident alerts, any combination thereof, or the like. The one or more alerts may also be intended for an insurance provider associated with the driver and/or the vehicle. The one or more alerts may include variables to be incorporated in a respective insurance policy (e.g., lowering or increasing rates, modifying the current coverage, etc.). The one or more alerts may be transmitted to an insurance pricing module.

In some examples, report generation system 106 may generate one or more alerts intended for a mobile device associated with the driver. For example, using the output from prediction system 104 and telematics data 118, report generation system 106 (and/or prediction system 104) may predict that a severe accident and/or vehicle collision has occurred in conjunction with a high-risk event. In some examples, this may be reflected in the prediction output of prediction system 104 (e.g., a prediction of 0.99). In that example, report generation system 106 may generate one or more alerts for the mobile device associated with the driver that may connect the driver to emergency response personnel, contact a tow truck or roadside assistance, query the driver regarding physical wellness, any combination thereof, or the like. Report generation system 106 may also generate one or more alerts intended for other mobile devices and/or other devices that may be associated with drivers and/or vehicles. These alerts may notify the other mobile devices that an accident has occurred, which may result in traffic delays. Report generation system 106 may also generate one or more alerts intended for the insurance provider associated with the driver and/or the vehicle to assist in filing a claim.

Using network(s) 120 (e.g., local area network, wireless local area network, wide area network, etc.), high-risk event detection system 122 may transmit one or more graphs, the simulated map, the one or more alerts, or any other reporting device generated by high-risk event detection system 122 to remote devices 116. Remote devices 116 may include, but is not limited to, mobile devices, smart phones, radios, law enforcement communication mechanisms, personal computers, controllers, servers, processors, and/or any other device capable of receiving communications via network(s) 120. In some examples, remote devices 116 may include a mobile device associated with the driver. The driver may receive real-time updates regarding the occurrence of high-risk events of the duration of the particular trip. The real-time updates may include warnings, advice, cautions, statistics, the simulated map, the one or more graphs, any combination thereof, or the like. For example, the driver may receive a driving score at the conclusion of a particular trip that may be based on the occurrence of high-risk events over the duration of the particular trip. The driving score may be updated in real-time as the driver conducts the particular trip. In some other examples, the real-time updates may include suggestions to the driver, including, but not limited to, warnings to pull over, suggestions to take another route, driving tips, etc.

Figure 2:
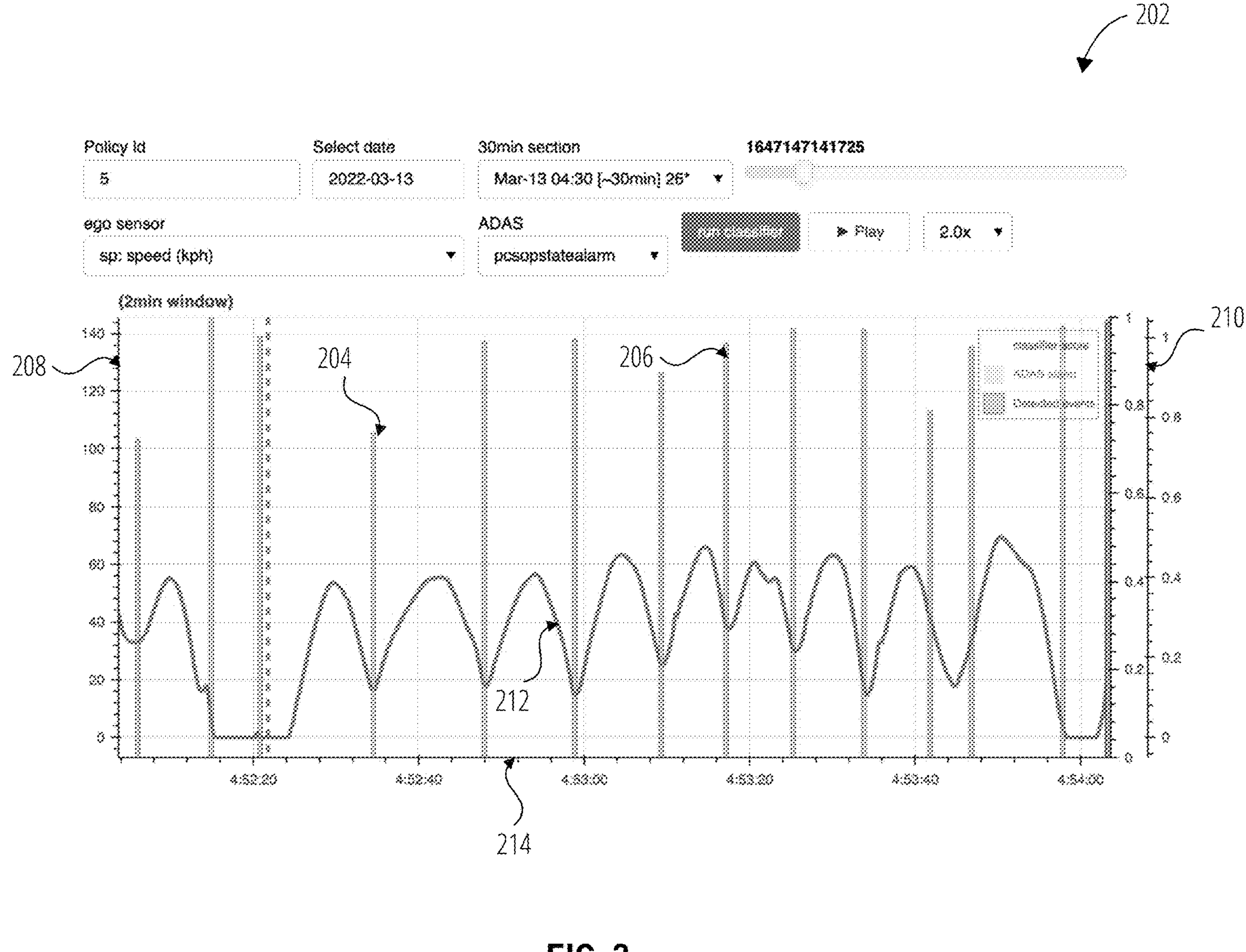
FIG. 2 illustrates an example output of the systems described herein for predicting high-risk events according to aspects of the present disclosure.

FIG. 2 illustrates an example output of the systems described herein for predicting high-risk events according to aspects of the present disclosure. For example, report generation system 106 (as described in FIG. 1) may generate graph 202. Graph 202 is a mere example of a possible implementation of the system described in FIG. 1 and throughout the specification and is not intended to be limiting.

Graph 202 illustrates a graphical representation of a vehicle's speed over a two-minute time window. The speed of the vehicle is indicated by line 212 and first axis 208. The vertical bars, shown at, for example, elements 204 and 206, indicate high-risk events at the time indicated by second axis 214. The length of the vertical bar, using third axis 210 as a reference, indicates the probability of the occurrence of a high-risk event. For example, element 206 has a higher probability of being a high-risk event than element 204. However, element 204, 206, and all other vertical bars displayed on graph 202 exceed the minimum threshold necessary to statistically confirm the occurrence of a high-risk event.

Figure 3:
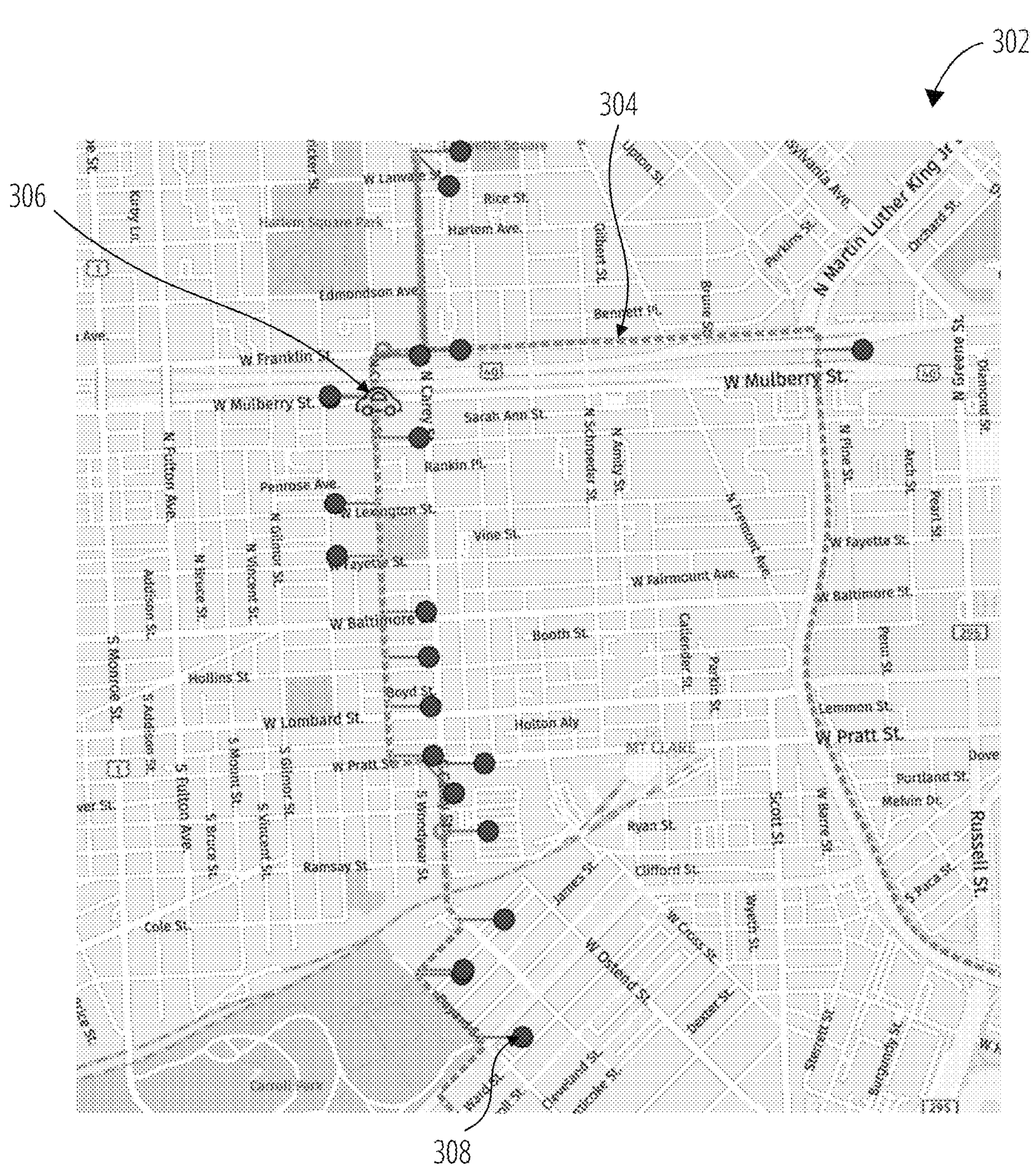
FIG. 3 illustrates an example output of the systems described herein for predicting high-risk events according to aspects of the present disclosure.

FIG. 3 illustrates an example output of the systems described herein for predicting high-risk events according to aspects of the present disclosure. For example, report generation system 106 (as described in FIG. 1) may generate simulated map 302. Simulated map 302 is a mere example of a possible implementation of the system described in FIG. 1 and throughout the specification and is not intended to be limiting.

Simulated map 302 illustrates a map representing a vehicle's transit route over a particular trip. The transit route may be illustrated by line 304. The current location of the vehicle may be represented by element 306. High-risk events detected by high-risk event detection system 122 (as described in FIG. 1) may be displayed through a marker, as shown, for example, by element 308.

Figure 4:
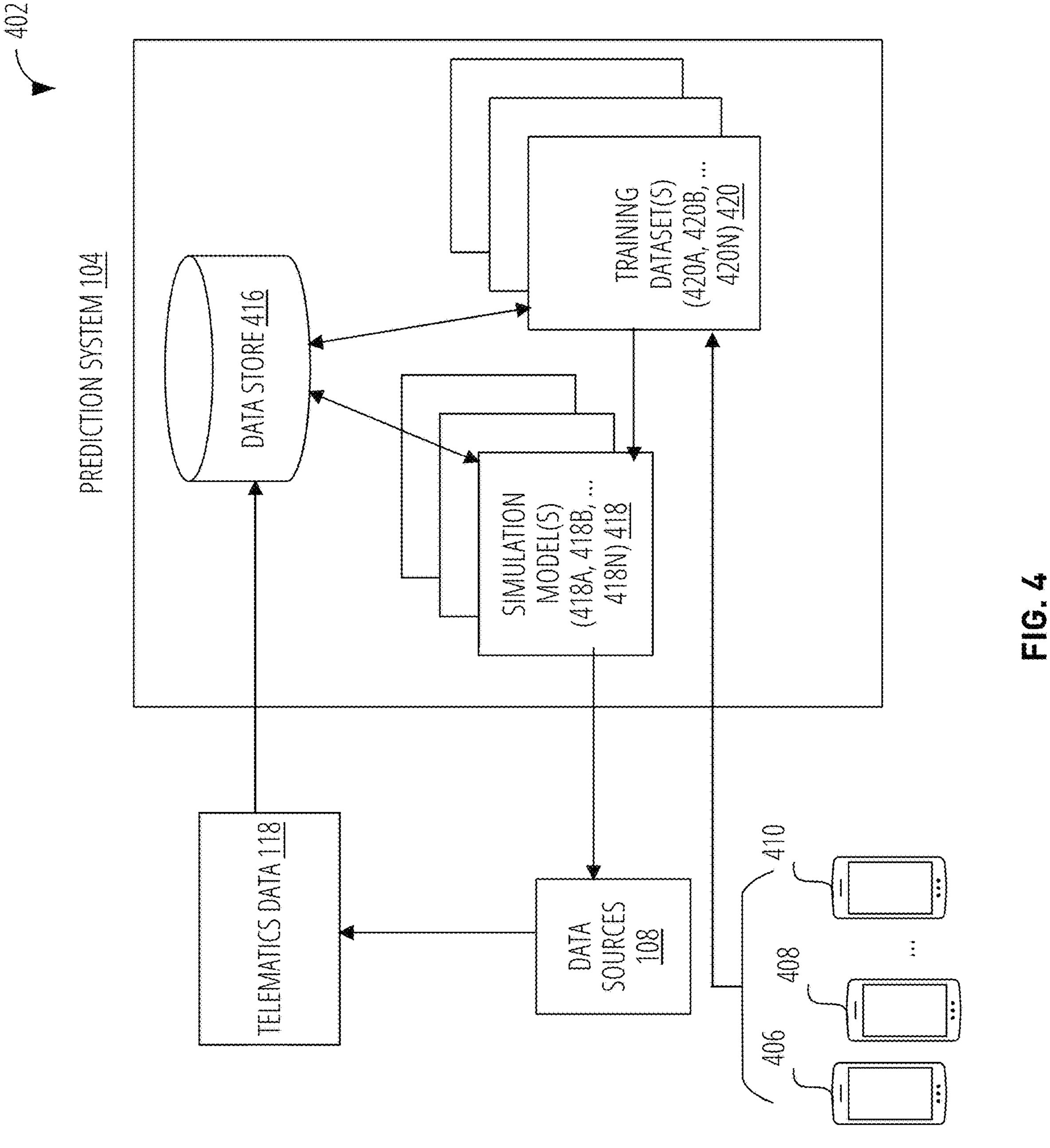
FIG. 4 illustrates an example system for implementing a machine-learning elements for predicting high-risk events according to aspects of the present disclosure.

FIG. 4 illustrates an example system for implementing a machine-learning element for predicting high-risk events according to aspects of the present disclosure. The example system illustrates a block diagram demonstrating a prediction system for generating a prediction for a likelihood of a high-risk event based on a high-risk event prediction algorithm. Data sources 108, such as a mobile device, one or more sensors associated with a vehicle, or some other form of telematics device, may collect telematics data 118. Telematics data 118 may be collected from a global position system (GPS), micro-electro-mechanical system (MEMS) sensors, and other data logging tools. Telematics data 118 captured can include location, speed, idling time, harsh acceleration or braking, vehicle faults, velocity, lateral and/or longitudinal location, lateral and/or longitudinal acceleration, accelerometer data, and more.

Telematics data 118 may be sent to prediction system 104 to ultimately output a prediction that a movement occurring during an event is not associated with a high-risk driving behavior when the prediction score is below a threshold score. Prediction system 104 may comprise a remote processor, partially comprise the remote processor and use one or more processors on one or more devices of data sources 108, or fully determine the prediction on one or more processors on one or more devices of data sources 108. If prediction system 104 is remote, data sent to and from a mobile application may be via an application programming interface (API).

Telematics data 118 may include kinematic variables, which may include at least one of global positioning system (GPS) speed variables, velocity variables (e.g., velocity vectors), GPS altitude variables, and/or acceleration variables (e.g., acceleration vectors, longitudinal and/or lateral acceleration values), stored at data store 416 or at a device of data sources 108. In one example, the telematics data 118 includes a longitudinal acceleration component, a lateral acceleration component, and/or a directional component (e.g., vertical). The telematics data 118 may include a predefined acceleration vector over a predefined time or time series and/or a predefined velocity vector over a predefined time and/or time series. In some cases, the kinematic variables may be associated with a machine-learning model for identifying high-risk events (e.g., a recurrent neural network, a deep learning model, a convolutional neural network, etc.). Simulation models 418 (of a plurality of different simulation models 418A, 418B, . . . 418N) may receive telematics data 118 from data store 416 or may directly receive telematics data 118. A first simulation model of simulation models 418 (e.g., 418A) may extract a first subset of the kinematic variables based on a first time window associated with a type of event (e.g., a high-risk event, a vehicle accident, a collision, etc.). The first simulation model may determine, by the high-risk event prediction algorithm, a first prediction score based on the first subset of variables, the first prediction score associated with a likelihood that the movement is associated with a first type of event (e.g., a high-risk event, collision, vehicle accident, etc.).

In some examples, the first simulation model may output a prediction that the movement is not association with the first type of event when the first prediction score is below a threshold score. As such, the first simulation model may be trained (e.g., by supervised training, unsupervised training, etc.) by respective training datasets 420 (of a plurality of different respective training datasets 420A, 420B, . . . 420N). The training datasets may include training datasets for training the machine-learning models, training datasets to validate an in-training or trained machine-learning model, training datasets to test a trained machine-learning model, and/or the like. The first simulation model may be trained by the high-risk event prediction algorithm and may receive a dataset that includes counterfactual events (e.g., non-high-risk events), high-risk events, vehicle accidents, near-misses, collisions, any combination thereof, or the like, from the data store 416. The dataset may be collected data from other devices 406, 408, and 410 (e.g., mobile devices, data stores, external sources, memory devices, etc.). The first simulation model may be trained using supervised learning, unsupervised learning, self-supervised learning, or the like. The first simulation model may be trained for a predetermined time interval, a predetermined quantity of iterations, until one or more target accuracy metrics have exceeded a corresponding threshold function (e.g., accuracy, precision, area under the curve, logarithmic loss, F1 score, weighted human disagreement rate, cross entropy, mean absolute error, mean square error, etc.), user input, combinations thereof, or the like. Once trained, prediction system 104 may validate and/or test the trained simulation models 418 using additional training datasets.

Figure 5:
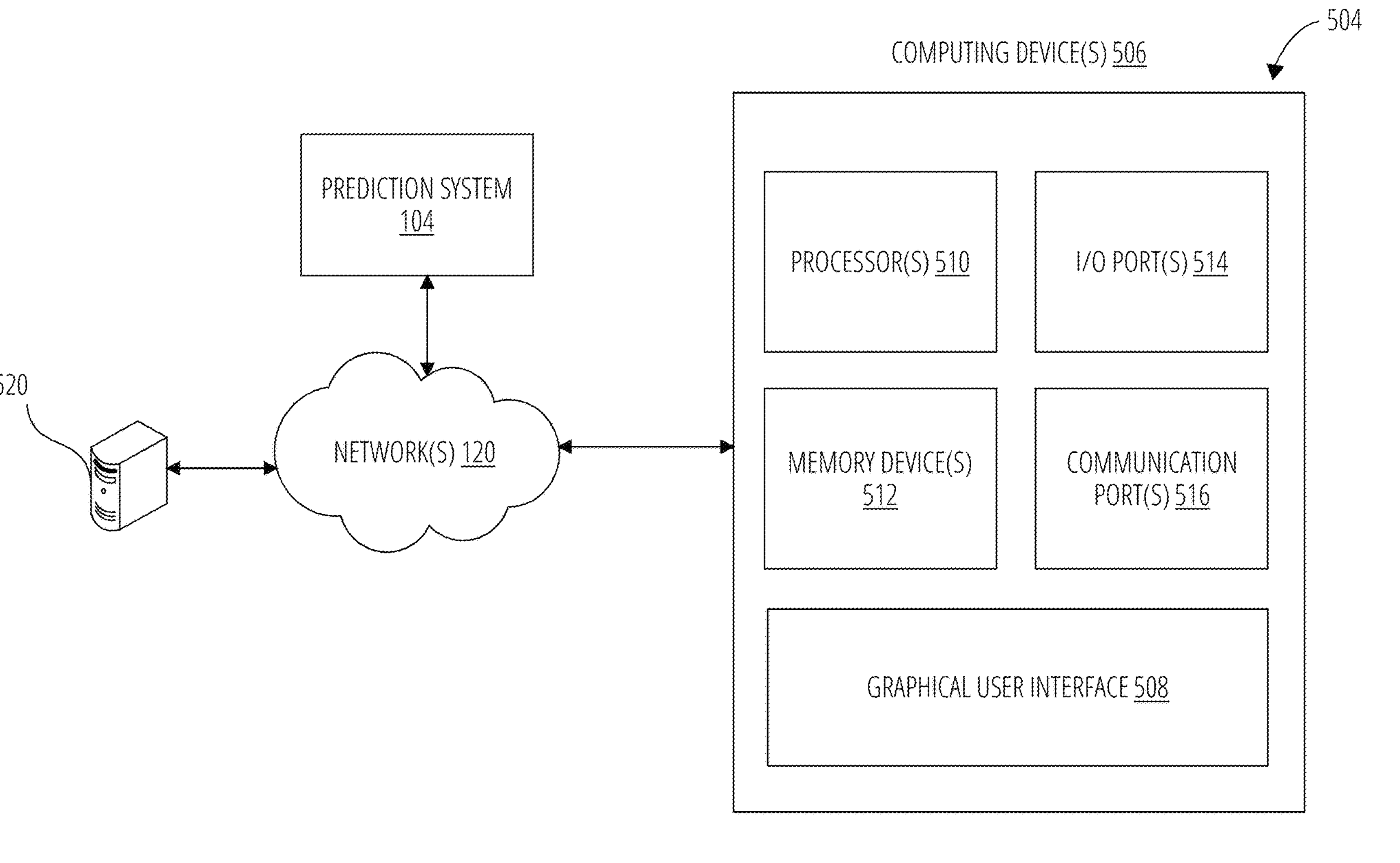
FIG. 5 illustrates an example computing device for predicting high-risk events according to aspects of the present disclosure.

FIG. 5 illustrates an example computing device for predicting high-risk events according to aspects of the present disclosure. The example computing device includes an example network environment with one or more computing devices for generating a prediction for a likelihood of an occurrence of a high-risk event based on a respective high-risk event prediction algorithm for a particular type of event. The example network environment 504 includes one or more network(s) 120, which can be a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, network(s) 120 can include any type of network, such as the Internet, an intranet, a Virtual Private Network (VPN), a Voice over Internet Protocol (VOIP) network, a wireless network (e.g., Bluetooth), a cellular network, a satellite network, combinations thereof, etc.

In some cases, server device computing device(s) 506 runs software and/or a software development kit (SDK) that generate a prediction for a likelihood of the occurrence of a high-risk event based on a high-risk event prediction algorithm. In some cases, the models and associated logic may be accessed remotely via the cloud and applied on server device computing device(s) 506. A local model may reside on the server device computing device(s) 506 in the case the server device computing device(s) 506 is offline.

Network(s) 120 provide access to and interactions with systems to generate a prediction for a likelihood of the occurrence of a high-risk event based on the high-risk event prediction algorithm. Network(s) 120 can include communications network components such as, but not limited to gateways routers, servers, and registrars, which enable communication across network(s) 120. In one implementation, the communications network components include multiple ingress/egress routers, which may have one or more ports, in communication with network(s) 120. Communication via any of the networks can be wired, wireless, or any combination thereof.

The network environment 504 may also include at least one server device 520 hosting software, application(s), websites, and the like for operating prediction system 104 for generating a prediction for a likelihood of the occurrence of a high-risk event based on the high-risk event prediction algorithm. Prediction system 104 can receive inputs from various computing devices and transform the received input data into other unique types of data. Server device 520 may be a single server, a plurality of servers with each such server being a physical server or a virtual machine, or a collection of both physical servers and virtual machines.

In another implementation, a cloud hosts one or more components of systems illustrated in FIG. 1 (e.g., system 124), FIG. 4 (e.g., system 402), and FIG. 5. Server device 520 may represent an instance among large instances of application servers in a cloud computing environment, a data center, or other computing environment. The server device 520 can access data stored at one or more database(s) (e.g., including any of the values or identifiers discussed herein). Systems 124 and 402, the server device 520, and/or other resources connected to network(s) 120 may access one or more other servers to access other websites, applications, web services interfaces, GUIs, storage devices, APIs, computing devices, or the like to perform the techniques discussed herein. The server(s) can include one or more computing device(s) 506, as discussed in greater detail below.

For instance, the network environment 504 can include one or more computing device(s) 506 for executing prediction system 104 and/or generating a prediction for a likelihood of the occurrence of a high-risk event based on the high-risk event prediction algorithm. In one implementation, one or more computing device(s) 506 include one or more server devices 520 executing prediction system 104 as a software application and/or a module or algorithmic component of software.

In some instances, computing device(s) 506 can include a computer, a personal computer, a desktop computer, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. Computing device(s) 506 may be integrated with, form a part of, or otherwise be associated with the systems/network environments illustrated in FIG. 1 and FIG. 4. It will be appreciated that specific implementations of these devices may be of differing possible specific computing architectures not all of which are specifically discussed herein but will be understood by those of ordinary skill in the art.

Computing device(s) 506 may be a computing system capable of executing a computer program product to execute a computer process. Data and program files may be input to computing device(s) 506, which reads the files and executes the programs therein. Some of the elements of the computing device(s) 506 include one or more hardware processor(s) 510, one or more memory device(s) 512, and/or one or more ports, such as input/output (I/O) 514 and communication port(s) 516. Additionally, other elements that will be recognized by those skilled in the art may be included in computing device(s) 506 but are not explicitly depicted in FIG. 5 or discussed further herein. Various elements of computing device(s) 506 may communicate with one another by way of communication port(s) 516 and/or one or more communication buses, point-to-point communication paths, or other communication means.

Processor(s) 510 may include, for example, a central processing unit (CPU), a microprocessor, a microcontroller, a digital signal processor (DSP), and/or one or more internal levels of cache. There may be one or more processor(s) 510, such that processor(s) 510 comprises a single central-processing unit, or a plurality of processing units capable of executing instructions and performing operations in parallel with each other, commonly referred to as a parallel processing environment.

Computing device(s) 506 may be a conventional computer, a distributed computer, or any other type of computer, such as one or more external computers made available via a cloud computing architecture. The presently described technology is optionally implemented in software stored on the data storage device(s) such as the memory device(s) 512, and/or communicated via one or more of the I/o port(s) 514 and the communication port(s) 516, thereby transforming computing device(s) 506 to a special purpose machine for implementing the operations described herein and generating a prediction for a likelihood of the occurrence of a high-risk event based on the high-risk event prediction algorithm. Moreover, computing device(s) 506 receives various types of input data (e.g., in different data formats) and transforms the input data through the stages of the data flow described herein into new types of data files (e.g., predictions for a likelihood of the occurrence of a high-risk event).

The one or more memory device(s) 512 may include any non-volatile data storage device capable of storing data generated or employed within computing device(s) 506, such as computer executable instructions for performing a computer process, which may include instructions of both application programs and an operating system (OS) that manages the various components of computing device(s) 506. Memory device(s) 512 may include, without limitation, magnetic disk drives, optical disk drives, solid state drives (SSDs), flash drives, and the like. Memory device(s) 512 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 512 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in memory device(s) 512 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, computing device(s) 506 includes one or more ports, such as I/O port(s) 514 and communication port(s) 516, for communicating with other computing or network devices. It will be appreciated that the I/O port(s) 514 and communication port(s) 516 may be combined or separate and that more or fewer ports may be included in computing device(s) 506.

I/O port(s) 514 may be connected to an I/O device, or other device, by which information is input to or output from computing device(s) 506. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into computing device(s) 506 via I/O port(s) 514. Similarly, the output devices may convert electrical signals received from computing device(s) 506 via I/O port(s) 514 into signals that may be sensed as output by a human, such as sound, light, and/or touch. The input device may be an alphanumeric input device, including alphanumeric and other keys for communicating information and/or command selections to processor(s) 510 via I/O port(s) 514. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, communication port(s) 516 is connected to network(s) 120 so computing device(s) 506 can receive network data useful in executing the methods and systems set out herein as well as transmitting information and network configuration changes determined thereby. Stated differently, communication port(s) 516 connects computing device(s) 506 to one or more communication interface devices configured to transmit and/or receive information between computing device(s) 506 and other devices (e.g., network devices of network(s) 120) by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via communication port(s) 516 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, communication port(s) 516 may communicate with an antenna or other link for electromagnetic signal transmission and/or reception.

In an example, prediction system 104 and/or other software, modules, services, and operations discussed herein may be embodied by instructions stored on memory device(s) 512 and executed by processor(s) 510.

The system 504 set forth in FIG. 5 is but one possible example of a computing device or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by computing device(s) 506.

Figure 6:
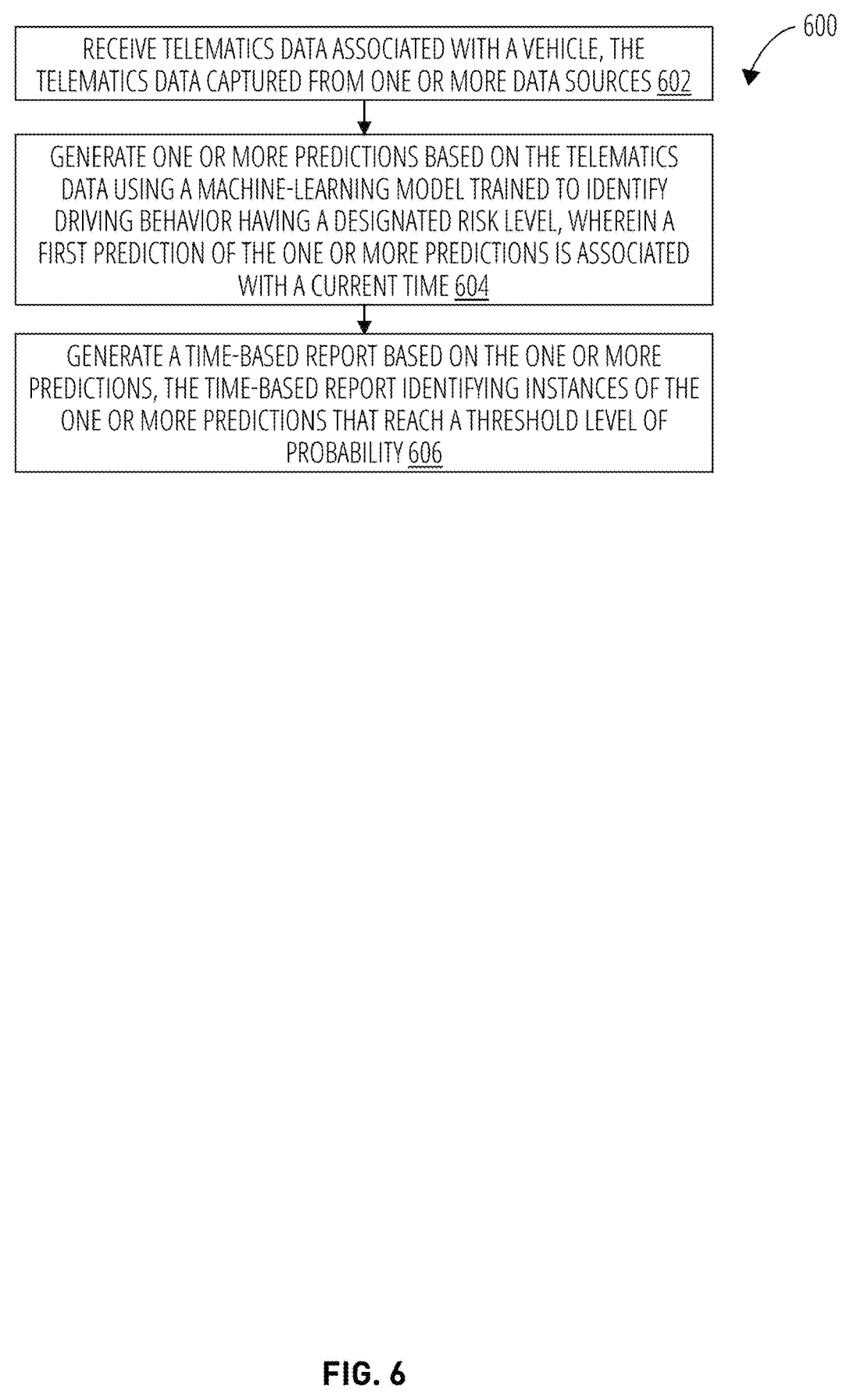

FIG. 6 illustrates example operations for generating a prediction for a likelihood of the occurrence of a high-risk event based on a high-risk event prediction algorithm, which can be performed by any of the systems described herein (e.g., FIG. 1, FIG. 4, and FIG. 5). At operation 602, method 600 receives telematics data associated with a vehicle collected from one or more data sources. The one or more data sources may include one or more external sources, including, but not limited to, the vehicle, a mobile device, traffic cameras, RADAR data, GPS data, any combination thereof, or the like. The telematics data may include raw data gathered from the one or more data sources that pertain to a particular trip of the vehicle.

The raw data may include, but is not limited to, gyroscope data of the vehicle, dashboard camera video footage of the vehicle, RADAR data of the vehicle, speed/velocity data of the vehicle, acceleration (e.g., two-dimensional acceleration, including lateral and/or longitudinal, and/or three-dimensional acceleration) data of the vehicle, any combination thereof, or the like. In some examples, the vehicle may gather the raw data from a dashboard camera mounted on the vehicle, one or more sensors placed on vehicle, GPS data associated with vehicle, RADAR sensors placed on vehicle, any combination thereof, or the like, and may transmit the data in real-time or near-real-time. A mobile device may gather data using internal sensors included in mobile device (e.g., microphone, camera, gyroscope, accelerometer, thermometer, etc.) and may transmit the data in real-time or near-real-time.

At operation 604, method 600 generates one or more predictions based on the telematics data using a machine-learning model trained to identify driving behavior having a designated risk level, wherein a first prediction of the one or more predictions is associated with a current time. The machine-learning model may be configured to process the telematics data according to a high-risk event prediction algorithm and may be trained using a series of historical data sets associated with historical trips. The historical trips may include one or more events, which may include high-risk events.

In some examples, the machine-learning model may process the telematics data in real-time or near-real-time. In some other examples, the machine-learning model may comprise a post-processing system for the vehicle and/or an associated driver, such that the processing and detection of one or more high-risk events may occur after the conclusion of a particular trip and/or not in real-time. The machine-learning model may output, using the telematics data, a likelihood that a high-risk event occurred at a specific point in time within the particular trip associated with the telematics data. If the likelihood exceeds a threshold value, the specific point in time may be marked as a high-risk event.

At operation 606, method 600 generates a time-based report of the one or more predictions, the time-based report identifying instances of the one or more predictions that reach a threshold value. The time-based report may be comprised of graphs, simulated maps, distributed alerts, any combination thereof, or the like. The time-based report may be made available to a driver of the vehicle in real-time, such that the driver receives real-time feedback regarding the driver's current driving habits. In some examples, the time-based report may be made available after the conclusion of the particular trip. The time-based report may also include alerts to one or more remote devices, which may include, but are not limited to, emergency contacts associated with the driver, law enforcement, emergency responders, devices associated with an insurance provider, any combination thereof, or the like.

What is claimed is:

1. A method comprising:

receiving telematics data associated with a vehicle in real-time, the telematics data captured from one or more data sources, wherein the telematics data is received from a sensor configuration including at least one of a vehicle-mounted accelerometer, a mobile device accelerometer, or a GPS positioning sensor, and wherein the telematics data includes at least one of a predefined acceleration vector over a predefined amount of time or time series or a velocity vector over a predefined amount of time or time series;

continuously, generating, in real-time, one or more predictions based on the telematics data using a machine-learning model trained to identify driving behavior as an occurrence of a high-risk event, the generating comprises:

correlating the telematics data to a movement indicating a high-risk event using a high-risk prediction algorithm of the machine-learning model, wherein the movement is defined by the at least one of the predefined acceleration vector over the predefined amount of time or time series or the velocity vector over the predefined amount of time or times series;

determining, based on the correlation, a numerical score indicating a likelihood of an occurrence of a high-risk event, wherein when the numerical score exceeds a predetermined threshold value, the occurrence of the high-risk event is indicated;

wherein a first prediction of the one or more predictions is associated with a current time; and generating a time-based report based on the one or more predictions, the time-based report identifying instances of the one or more predictions that reach the predetermined threshold value.

2. The method of claim 1, wherein the telematics data includes a geographical location associated with the vehicle, and wherein the first prediction of the one or more predictions is further associated with a current geographical location of the vehicle associated with the current time.

3. The method of claim 2, wherein the time-based report includes a simulated map displaying locations at which the instances of the one or more predictions that reach the threshold value occurred.

4. The method of claim 1, further comprising:

transmitting the time-based report to a remote device.

5. The method of claim 4, wherein transmitting the time-based report to the remote device includes sending, at least one of:

an accident alert to a mobile device, a pricing variable to a pricing model, or a tow request to a device associated with a tow service.

6. The method of claim 1, wherein the one or more predictions is further generated based on second telematics data associated with a second vehicle.

7. The method of claim 1, further comprising:

training the machine-learning model using one or more historical occurrences events having a designated risk level.

8. The method of claim 1, wherein the one or more data sources includes at least one of a mobile device, a plurality of sensors associated with the vehicle, a dashboard camera associated with the vehicle, or global positioning systems.

9. A system comprising:

a vehicle monitoring system comprising a sensor configuration including at least one of a vehicle-mounted accelerometer, a mobile device accelerometer, or GPS positioning sensors that receives, in real-time, a telematics data associated with a vehicle collected from one or more data sources, wherein the telematics data includes at least one of a predefined acceleration value over a predefined amount of time or a velocity direction angle relative to a road direction;

a machine-learning model executed using at least one processor, the machine-learning model trained to identify driving behavior as an occurrence of a high-risk event that exceeds a predetermined threshold value, and continuously generates, in real-time or near real-time, one or more predictions based on the telematics data, wherein the generating comprises correlating the telematics data to a movement indicating a high-risk event using a high-risk prediction algorithm of the machine learning model, wherein the movement is defined by the at least one of the predefined acceleration vector over the predefined amount of time or time series or the velocity vector over the predefined amount of time or time series and determining a numerical score indicating a likelihood of the occurrence of the high-risk event based on the correlation, wherein when the numerical score exceeds the predetermined threshold value the high-risk event is indicated; and a controller generates a time-based report based on the one or more predictions.

10. The system of claim 9, wherein the time-based report includes a simulated map identifying instances of the one or more predictions that reach a threshold value.

11. The system of claim 9, wherein the controller transmits the time-based report to a remote device.

12. The system of claim 11, wherein transmitting the time-based report to the remote device includes sending, at least one of:

an accident alert to a mobile device, a price variable to a pricing model, or a tow request to a device associated with a tow service.

13. The system of claim 9, wherein a first prediction of the one or more predictions is associated with a current time.

14. One or more tangible non-transitory computer-readable storage media storing computer-executable instructions for performing a computer process on a computing system, the computer process comprising:

generating a set of training data, wherein the set of training data includes historical occurrences of events having a designated risk level of high-risk;

training a machine-learning model to identify high-risk driving behavior using the set of training data;

receiving, in real-time, a telematics data associated with a vehicle collected from one or more data sources;

continuously generating in real-time or near real-time, using the machine-learning model, one or more predictions based on the telematics data; and generating a time-based report based on the one or more predictions, the time-based report identifying instances of the one or more predictions that reach a threshold value, wherein the telematics data is received from a sensor configuration including at least one of a vehicle-mounted accelerometer, a mobile device accelerometer, or GPS positioning sensors, wherein the telematics data includes at least one of a predefined acceleration value over a predefined amount of time or a velocity direction angle relative to a road direction, and wherein the machine-learning model includes a high-risk prediction algorithm that correlates the telematics data to a movement indicating a high-risk event and determines a numerical score indicating a likelihood of an occurrence of a high-risk event based on the correlation, wherein the movement is defined by the at least one of the predefined acceleration vector over the predefined amount of time or time series or the velocity vector over the predefined amount of time or time series, and wherein when the numerical score exceeds a predetermined threshold value the high-risk event is indicated.

* * * * *